Oct. 30, 1934.  C. V. KENNEDY  1,979,040

SKI

Filed April 26, 1934

INVENTOR
Clayton Varnon Kennedy.

BY

ATTORNEY

Patented Oct. 30, 1934

1,979,040

UNITED STATES PATENT OFFICE 1,979,040

SKI

Clayton Varnon Kennedy, Birmingham, Ala.

Application April 26, 1934, Serial No. 722,417

1 Claim. (Cl. 280—8)

The invention relates to an improvement in skis, whereby the entire bracing assembly is housed inside a metal casing or shoe and securely fastened to the axle with an axle sleeve, and to the base by fittings which are located inside the metal case or shoe, and reinforced on the bottom of the runners by channel shaped fittings; and the objects of the improvement are; first, to eliminate all external braces, wires, and struts connecting the skis to the body, fuselage, or landing gear; second, to eliminate the danger of external ski braces, wires and struts from breaking and fouling; third, to provide a more flexible running and balanced ski; fourth, to increase speed when fitted to aircraft.

Figure 4:
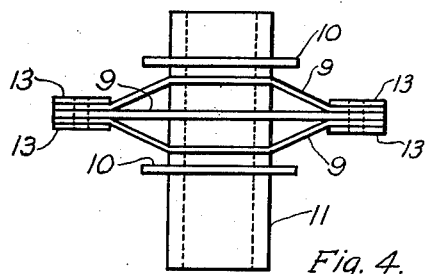
Figure 5:
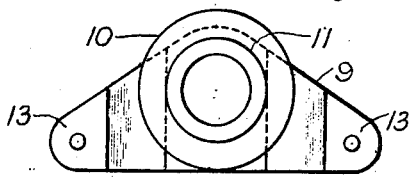
Figure 3:
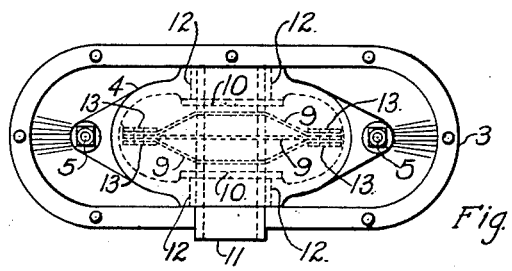
Figure 6:
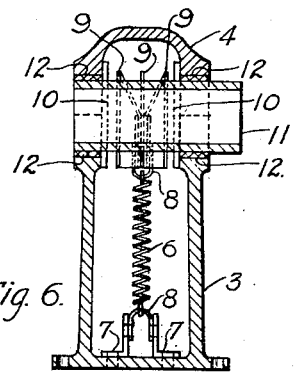
Figure 2:
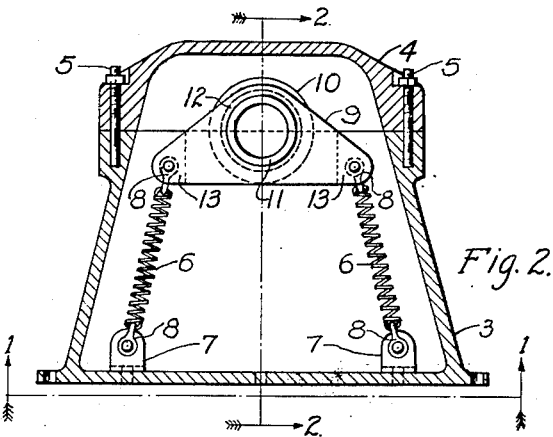
Figure 7:
Figure 8:
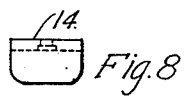
Figure 1:
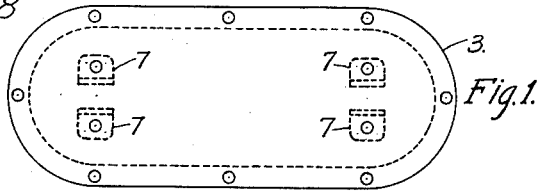

Figure 1 is a bottom view on the line 1—1, Figure 2; Figure 2 is a vertical section of the entire assembly; Figure 3 is a top view of the assembly; Figure 4, is a detailed top view of the axle sleeve and its assembly; Figure 5 is a detailed end view of Figure 4; Figure 6 is a vertical section of the assembly on line 2—2, Figure 2; Figure 7 is a detailed end view of the channel shaped fitting 14; Figure 8 is a detailed side view of the channel shaped fitting 14.

The metal casing or shoe is composed of part 3, of which the base is shown by Figure 1, and the removable head 4, connected to part 3, by bolts and nuts 5; fittings 7 are secured to the base of the casing or shoe by bolts which pass through the runners and the channel shaped fittings 14 (see Figures 7 and 8) which have recesses to bring the bolt heads "flush".

Braces 6, which can be either springs or shock absorber cord, and composed of any number of units (in this case 2) connected to the bottom fittings 7 by shackles or straps 8, and connected to horn 9 by shackles or straps 8. Horn 9 is made of 3 pieces of sheet metal, bent and formed and finished as shown by Figures 4 and 5, and welded to the axle sleeve 11. To reinforce horn 9 and provide a suitable bearing for the shackles or straps 8, there are reinforcing washers 13, welded to horn 9 (see Figures 4 and 5).

Washers 10 are welded to the axle sleeve 11, in position as shown by Figures 4 and 5 and 6. Bearings 12 provide a suitable bearing surface for the axle sleeve 11. The hollow axle sleeve 11 is to be machined to fit and slide over the axle, and the axle sleeve 11 securely connected to the axle on outside of the casing or shoe.

My invention is composed of the following parts; braces 6, fittings 7, fittings 14, horn 9, washers 10, axle sleeve 11.

My invention acts and operates in the following manner when applied to airplanes, ice and snow sleds; horn 9 is secured to axle sleeve 11, which is secured to axle. The axle is secured to the body or fuselage, so that, when the axle moves clockwise, horn 9 also moves clockwise and brings front brace or braces 6 in tension; when the axle moves counter-clockwise, horn 9 also moves counter-clockwise and brings rear brace or braces 6 in tension. Braces 6 when relieved of tension will bring the skis to their normal position, and being fixed and secured to the axle as shown and described will keep the skis from revolving around the axle.

I am aware that prior to my invention skis have been made and used on aircraft, ice and snow sleds. I therefore do not claim skis broadly but:

I claim:

A runner assembly comprising a runner, a pedestal mounted thereon, said pedestal consisting of a casing, an axle sleeve passing through the upper part of the casing, a horn secured to the sleeve, braces attached to each end of the horn and to fittings upon the runner within the casing.

CLAYTON VARNON KENNEDY.